US009772927B2

(12) United States Patent
Gounares et al.

(10) Patent No.: US 9,772,927 B2
(45) Date of Patent: Sep. 26, 2017

(54) USER INTERFACE FOR SELECTING TRACING ORIGINS FOR AGGREGATING CLASSES OF TRACE DATA (71) Applicant: Microsoft Technology Licensing, LLC, Redmond, WA (US)

(72) Inventors: Alexander G. Gounares, Kirkland, WA (US); Bryce B. Baril, Lynnwood, WA (US); Charles D. Garrett, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/036,325

(22) PCT Filed: Mar. 27, 2014

(86) PCT No.: PCT/IB2014/060240
§ 371 (c)(1),
(2) Date: May 12, 2016

(87) PCT Pub. No.: WO2015/071778
PCT Pub. Date: May 21, 2015

(65) Prior Publication Data
US 2016/0283345 A1 Sep. 29, 2016

Related U.S. Application Data (60) Provisional application No. 61/903,775, filed on Nov. 13, 2013, provisional application No. 61/903,781, (Continued)

(51) Int. Cl.
*G06F 9/44* (2006.01)
*G06F 11/36* (2006.01)
(Continued)

(52) U.S. Cl.
CPC ........ *G06F 11/3636* (2013.01); *G06F 3/0482* (2013.01); *G06F 3/0484* (2013.01);
(Continued)

(58) Field of Classification Search
CPC .. G06F 3/0482; G06F 3/0484; G06F 11/0709; G06F 11/079; G06F 11/302;
(Continued)

(56) References Cited

U.S. PATENT DOCUMENTS 4,907,151 A 3/1990 Bartlett
5,327,568 A 7/1994 Maejima et al.
(Continued)

FOREIGN PATENT DOCUMENTS

CN 1527968 9/2004
CN 101595457 12/2009
(Continued)

OTHER PUBLICATIONS

International Search Report and Written Opinion for PCT/US2013/073894 dated Apr. 1, 2014.
(Continued)

*Primary Examiner* — Qing Chen
(74) *Attorney, Agent, or Firm* — Workman Nydegger (57) ABSTRACT A tracing system may define an origin for consolidating and comparing trace paths within a traced application. A tracer may define an identifier that may be passed through a tracing route, and the identifier may be defined to capture specific instances or groups of instances of traces. The traces may be consolidated into a graphical representation of the program flow. The identifier may be passed across various boundaries, including function boundaries, library boundaries, application boundaries, device boundaries. An analysis system may consolidate or aggregate trace results having the same
(Continued)

identifier, and may render such data graphically or provide statistics using the identified datasets.

16 Claims, 6 Drawing Sheets

Related U.S. Application Data filed on Nov. 13, 2013, provisional application No. 61/903,786, filed on Nov. 13, 2013.

(51) Int. Cl.
| | |
|---|---|
| *G06F 17/00* | (2006.01) |
| *G06F 11/07* | (2006.01) |
| *G06F 11/34* | (2006.01) |
| *G06F 3/0482* | (2013.01) |
| *G06F 3/0484* | (2013.01) |
| *G06F 11/30* | (2006.01) |
| *G06T 11/20* | (2006.01) |

(52) U.S. Cl.
CPC ........ *G06F 11/079* (2013.01); *G06F 11/0709* (2013.01); *G06F 11/302* (2013.01); *G06F 11/3065* (2013.01); *G06F 11/34* (2013.01); *G06F 11/3495* (2013.01); *G06F 17/00* (2013.01); *G06T 11/206* (2013.01)

(58) Field of Classification Search
CPC .. G06F 11/3065; G06F 11/34; G06F 11/3466; G06F 11/3495; G06F 11/3636; G06F 17/00; G06T 11/206
USPC ................................. 717/124–135
See application file for complete search history.

(56) References Cited

U.S. PATENT DOCUMENTS

| | | | |
|---|---|---|---|
| 5,369,570 A | 11/1994 | Parad | |
| 5,535,393 A | 7/1996 | Reeve et al. | |
| 5,606,688 A | 2/1997 | McNutt et al. | |
| 5,689,363 A | 11/1997 | Dane et al. | |
| 5,758,183 A | 5/1998 | Scales | |
| 5,778,004 A | 7/1998 | Jennion et al. | |
| 5,870,606 A | 2/1999 | Lindsey | |
| 5,937,194 A | 8/1999 | Sundaresan | |
| 5,953,736 A | 9/1999 | O'Connor et al. | |
| 5,978,830 A | 11/1999 | Nakaya | |
| 6,032,201 A | 2/2000 | Tilery et al. | |
| 6,059,842 A | 5/2000 | Dumarot et al. | |
| 6,083,281 A | 7/2000 | Diec | |
| 6,158,049 A | 12/2000 | Goodwin | |
| 6,195,676 B1 | 2/2001 | Spix et al. | |
| 6,202,199 B1 | 3/2001 | Wygodny et al. | |
| 6,230,313 B1 | 5/2001 | Callahan | |
| 6,282,701 B1 | 8/2001 | Wygodny et al. | |
| 6,286,130 B1 | 9/2001 | Poulsen | |
| 6,321,204 B1 | 11/2001 | Kazami et al. | |
| 6,321,240 B1 | 11/2001 | Chilimbi et al. | |
| 6,381,735 B1 | 4/2002 | Hunt | |
| 6,584,487 B1 | 6/2003 | Saboff | |
| 6,598,141 B1 | 7/2003 | Dussud et al. | |
| 6,629,128 B1 | 9/2003 | Glass | |
| 6,662,358 B1 | 12/2003 | Berry et al. | |
| 6,735,687 B1 | 5/2004 | Kok | |
| 6,748,420 B1 | 6/2004 | Quatrano et al. | |
| 6,754,890 B1 | 6/2004 | Berry et al. | |
| 6,826,752 B1 | 11/2004 | Thornley et al. | |
| 6,856,950 B1 | 2/2005 | Abts et al. | |
| 6,892,226 B1 | 5/2005 | Tso et al. | |
| 6,928,488 B1 | 8/2005 | De Jong et al. | |
| 6,970,805 B1 | 11/2005 | Bierma et al. | |
| 6,981,265 B1 | 12/2005 | Rees et al. | |
| 7,058,928 B2 | 6/2006 | Wygodny | |
| 7,065,763 B1 | 6/2006 | Martin et al. | |
| 7,093,234 B2 | 8/2006 | Hibbeler et al. | |
| 7,117,504 B2 | 10/2006 | Smith et al. | |
| 7,143,412 B2 | 11/2006 | Koenen | |
| 7,168,068 B2 | 1/2007 | Dawson | |
| 7,185,367 B2 | 2/2007 | Munson | |
| 7,194,664 B1 * | 3/2007 | Fung | G06F 11/3636 714/32 |
| 7,386,839 B1 | 6/2008 | Golender et al. | |
| 7,389,494 B1 | 6/2008 | Cantrill | |
| 7,430,733 B1 | 9/2008 | Yaari | |
| 7,478,371 B1 | 1/2009 | Gove | |
| 7,493,400 B2 | 2/2009 | Loaiza | |
| 7,500,216 B1 | 3/2009 | Blunno et al. | |
| 7,580,905 B2 | 8/2009 | Lopez-Estrada | |
| 7,681,182 B1 | 3/2010 | Mistry et al. | |
| 7,681,188 B1 | 3/2010 | Tirumalai et al. | |
| 7,685,561 B2 | 3/2010 | Deem et al. | |
| 7,739,667 B2 | 6/2010 | Callahan et al. | |
| 7,743,380 B2 | 6/2010 | Seidman et al. | |
| 7,797,585 B1 | 9/2010 | Sahin et al. | |
| 7,827,539 B1 | 11/2010 | Wygodny | |
| 7,870,244 B2 | 1/2011 | Chong et al. | |
| 7,890,771 B2 | 2/2011 | England et al. | |
| 7,954,094 B2 | 5/2011 | Cascaval et al. | |
| 7,954,095 B2 | 5/2011 | Archer | |
| 7,971,010 B2 | 6/2011 | Schmelter et al. | |
| 8,032,866 B1 | 10/2011 | Golender et al. | |
| 8,037,465 B2 | 10/2011 | Tian | |
| 8,108,689 B2 | 1/2012 | Nicolson et al. | |
| 8,132,162 B2 | 3/2012 | Peterson | |
| 8,214,806 B2 | 7/2012 | Cong et al. | |
| 8,234,105 B1 | 7/2012 | Aldrich et al. | |
| 8,312,056 B1 | 11/2012 | Peng et al. | |
| 8,312,435 B2 | 11/2012 | Wygodny et al. | |
| 8,336,056 B1 | 12/2012 | Gadir | |
| 8,473,925 B2 | 6/2013 | Gagliardi et al. | |
| 8,490,087 B2 | 7/2013 | Beaty et al. | |
| 8,495,598 B2 | 7/2013 | Gounares et al. | |
| 8,543,907 B1 | 9/2013 | Roskind | |
| 8,566,800 B2 | 10/2013 | Gagliardi | |
| 8,566,804 B1 | 10/2013 | Carrick et al. | |
| 8,595,327 B2 | 11/2013 | Lee et al. | |
| 8,595,743 B2 | 11/2013 | Gounares et al. | |
| 8,607,018 B2 | 12/2013 | Gounares et al. | |
| 8,615,766 B2 | 12/2013 | Gounares et al. | |
| 8,645,930 B2 | 2/2014 | Lattner et al. | |
| 8,650,538 B2 | 2/2014 | Gounares et al. | |
| 8,656,134 B2 | 2/2014 | Gounares et al. | |
| 8,656,135 B2 | 2/2014 | Gounares et al. | |
| 8,656,378 B2 | 2/2014 | Gounares et al. | |
| 8,694,574 B2 | 4/2014 | Gounares et al. | |
| 8,700,838 B2 | 4/2014 | Gounares et al. | |
| 8,707,326 B2 | 4/2014 | Garrett | |
| 8,726,255 B2 | 5/2014 | Gounares et al. | |
| 8,752,021 B2 | 6/2014 | Li et al. | |
| 8,752,034 B2 | 6/2014 | Gounares et al. | |
| 8,756,581 B2 | 6/2014 | Castanos et al. | |
| 8,789,030 B2 | 7/2014 | Gounares et al. | |
| 8,789,032 B1 | 7/2014 | Li et al. | |
| 8,793,669 B2 | 7/2014 | Garrett | |
| 8,924,941 B2 | 12/2014 | Krajec et al. | |
| 9,015,668 B1 | 4/2015 | Michelsen | |
| 9,203,894 B1 | 12/2015 | Ginzburg | |
| 9,497,136 B1 | 11/2016 | Ramarao | |
| 2001/0003822 A1 | 6/2001 | Hibi et al. | |
| 2001/0056456 A1 | 12/2001 | Cota-Robles | |
| 2002/0019887 A1 | 2/2002 | Moore | |
| 2002/0072830 A1 | 6/2002 | Hunt | |
| 2002/0073063 A1 * | 6/2002 | Faraj | G06F 11/3636 |
| 2002/0087949 A1 | 7/2002 | Golender | |
| 2002/0112033 A1 | 8/2002 | Doemling et al. | |
| 2002/0120815 A1 | 8/2002 | Zahavi et al. | |
| 2002/0138788 A1 | 9/2002 | Yenne et al. | |
| 2002/0163498 A1 | 11/2002 | Chang et al. | |
| 2002/0165901 A1 | 11/2002 | Rajan | |
| 2002/0184615 A1 | 12/2002 | Sumner | |
| 2002/0196184 A1 | 12/2002 | Johnson et al. | |
| 2002/0196229 A1 | 12/2002 | Chen et al. | |

(56) References Cited

U.S. PATENT DOCUMENTS

| | | |
|---|---|---|
| 2002/0199172 A1 | 12/2002 | Bunnell |
| 2002/0199179 A1 | 12/2002 | Lavery et al. |
| 2003/0023576 A1 | 1/2003 | Gilson |
| 2003/0041069 A1 | 2/2003 | Yorke |
| 2003/0056201 A1 | 3/2003 | Degenaro et al. |
| 2003/0058277 A1 | 3/2003 | Bowman-Amuah |
| 2003/0061574 A1 | 3/2003 | Saluja et al. |
| 2003/0070161 A1 | 4/2003 | Wong et al. |
| 2003/0088606 A1 | 5/2003 | Miller et al. |
| 2003/0088854 A1 | 5/2003 | Wygodny et al. |
| 2003/0093408 A1 | 5/2003 | Brown et al. |
| 2003/0145314 A1 | 7/2003 | Nguyen et al. |
| 2003/0149765 A1 | 8/2003 | Hubbard |
| 2003/0217155 A1 | 11/2003 | Greck et al. |
| 2003/0231207 A1 | 12/2003 | Huang |
| 2004/0015600 A1 | 1/2004 | Tiwary et al. |
| 2004/0015929 A1 | 1/2004 | Lewis et al. |
| 2004/0034853 A1 | 2/2004 | Gibbons et al. |
| 2004/0054992 A1 | 3/2004 | Nair et al. |
| 2004/0075690 A1 | 4/2004 | Cirne |
| 2004/0088699 A1 | 5/2004 | Suresh |
| 2004/0103400 A1 | 5/2004 | Johnsen |
| 2004/0103410 A1 | 5/2004 | Sakai |
| 2004/0123274 A1 | 6/2004 | Inagaki et al. |
| 2004/0139480 A1 | 7/2004 | Delpuch et al. |
| 2004/0154019 A1 | 8/2004 | Aamodt et al. |
| 2004/0194098 A1 | 9/2004 | Chung et al. |
| 2004/0205718 A1 | 10/2004 | Reynders |
| 2004/0225443 A1 | 11/2004 | Kamps |
| 2004/0239681 A1 | 12/2004 | Robotham et al. |
| 2005/0015368 A1 | 1/2005 | Payton et al. |
| 2005/0041692 A1 | 2/2005 | Kallstenius |
| 2005/0066149 A1 | 3/2005 | Kanade |
| 2005/0091645 A1 | 4/2005 | Chilimbi et al. |
| 2005/0091646 A1 | 4/2005 | Chilimbi et al. |
| 2005/0108259 A1 | 5/2005 | Watanabe et al. |
| 2005/0108517 A1 | 5/2005 | Dillon et al. |
| 2005/0131995 A1 | 6/2005 | Chase et al. |
| 2005/0138111 A1 | 6/2005 | Aton et al. |
| 2005/0149697 A1 | 7/2005 | Enright et al. |
| 2005/0149912 A1 | 7/2005 | Farcy et al. |
| 2005/0155019 A1 | 7/2005 | Levine et al. |
| 2005/0177836 A1 | 8/2005 | Lari et al. |
| 2005/0180330 A1 | 8/2005 | Shapiro |
| 2005/0188272 A1 | 8/2005 | Bodorin et al. |
| 2005/0198332 A1 | 9/2005 | Laertz et al. |
| 2005/0234974 A1 | 10/2005 | Bailey et al. |
| 2005/0240567 A1 | 10/2005 | Klosterhalfen |
| 2005/0262181 A1 | 11/2005 | Schmidt et al. |
| 2005/0262493 A1 | 11/2005 | Schmidt et al. |
| 2005/0262512 A1 | 11/2005 | Schmidt et al. |
| 2006/0005179 A1 | 1/2006 | Kawahara |
| 2006/0005194 A1 | 1/2006 | Kawahara |
| 2006/0013134 A1 | 1/2006 | Neuse |
| 2006/0015612 A1 | 1/2006 | Shimazaki et al. |
| 2006/0037022 A1 | 2/2006 | Byrd et al. |
| 2006/0047752 A1 | 3/2006 | Hornby |
| 2006/0074970 A1 | 4/2006 | Narayanan |
| 2006/0101033 A1 | 5/2006 | Hu et al. |
| 2006/0101416 A1 | 5/2006 | Callahan et al. |
| 2006/0101467 A1 | 5/2006 | Buco et al. |
| 2006/0106843 A1 | 5/2006 | Middelfart et al. |
| 2006/0106926 A1 | 5/2006 | Kato et al. |
| 2006/0156017 A1 | 7/2006 | McIsaac et al. |
| 2006/0167939 A1 | 7/2006 | Seidman et al. |
| 2006/0168583 A1 | 7/2006 | Basso et al. |
| 2006/0174165 A1 | 8/2006 | Shaffer et al. |
| 2006/0179429 A1 | 8/2006 | Eggers et al. |
| 2006/0190596 A1 | 8/2006 | Horikawa |
| 2006/0195747 A1 | 8/2006 | Pramanick et al. |
| 2006/0200738 A1 | 9/2006 | Tarle et al. |
| 2006/0224375 A1 | 10/2006 | Barnett et al. |
| 2006/0230319 A1 | 10/2006 | Ryali et al. |
| 2006/0242627 A1 | 10/2006 | Wygodny et al. |
| 2006/0248177 A1 | 11/2006 | Dostert et al. |
| 2006/0256805 A1 | 11/2006 | Cho et al. |
| 2006/0277477 A1 | 12/2006 | Christenson |
| 2007/0006159 A1 | 1/2007 | Hecht et al. |
| 2007/0016949 A1 | 1/2007 | Dunagan et al. |
| 2007/0050174 A1 | 3/2007 | Dewitt et al. |
| 2007/0061241 A1 | 3/2007 | Jovanovic et al. |
| 2007/0079298 A1 | 4/2007 | Tian et al. |
| 2007/0089094 A1 | 4/2007 | Levine et al. |
| 2007/0100967 A1 | 5/2007 | Smith et al. |
| 2007/0118538 A1 | 5/2007 | Ahem et al. |
| 2007/0136201 A1 | 6/2007 | Sah et al. |
| 2007/0136320 A1 | 6/2007 | Sah et al. |
| 2007/0136337 A1 | 6/2007 | Sah et al. |
| 2007/0136443 A1 | 6/2007 | Sah et al. |
| 2007/0140131 A1 | 6/2007 | Malloy et al. |
| 2007/0143795 A1 | 6/2007 | Tran |
| 2007/0150895 A1 | 6/2007 | Kurland |
| 2007/0157177 A1 | 7/2007 | Bouguet et al. |
| 2007/0168992 A1 | 7/2007 | Bates |
| 2007/0169002 A1 | 7/2007 | Kronlund et al. |
| 2007/0169042 A1 | 7/2007 | Janczewski |
| 2007/0180147 A1 | 8/2007 | Leigh |
| 2007/0192468 A1 | 8/2007 | Keeler |
| 2007/0198524 A1 | 8/2007 | Branda et al. |
| 2007/0204010 A1 | 8/2007 | Sah et al. |
| 2007/0204223 A1 | 8/2007 | Bartels et al. |
| 2007/0214333 A1 | 9/2007 | Nijhawan et al. |
| 2007/0220513 A1 | 9/2007 | Hwang |
| 2007/0226696 A1 | 9/2007 | Radhakrishnan et al. |
| 2007/0226700 A1 | 9/2007 | Gal |
| 2007/0226758 A1 | 9/2007 | Waldo et al. |
| 2007/0234002 A1 | 10/2007 | Litke |
| 2007/0239528 A1 | 10/2007 | Xie et al. |
| 2007/0245310 A1 | 10/2007 | Rosenstein et al. |
| 2007/0260849 A1 | 11/2007 | Chen et al. |
| 2007/0271283 A1 | 11/2007 | Maryka et al. |
| 2007/0277056 A1 | 11/2007 | Varadarajan et al. |
| 2007/0294581 A1 | 12/2007 | Dean et al. |
| 2008/0005281 A1 | 1/2008 | Hsueh et al. |
| 2008/0022285 A1 | 1/2008 | Cherkasova et al. |
| 2008/0022286 A1 | 1/2008 | Chung et al. |
| 2008/0049022 A1 | 2/2008 | Sherb et al. |
| 2008/0092128 A1 | 4/2008 | Corry et al. |
| 2008/0098180 A1 | 4/2008 | Larson et al. |
| 2008/0104362 A1 | 5/2008 | Buros et al. |
| 2008/0104451 A1 | 5/2008 | Blanchard et al. |
| 2008/0109792 A1 | 5/2008 | O'Dowd |
| 2008/0117216 A1 | 5/2008 | Dorie |
| 2008/0120400 A1 | 5/2008 | Keller et al. |
| 2008/0126828 A1 | 5/2008 | Girouard et al. |
| 2008/0127108 A1 | 5/2008 | Ivanov et al. |
| 2008/0127109 A1 | 5/2008 | Simeon |
| 2008/0127112 A1 | 5/2008 | Kettley et al. |
| 2008/0127116 A1 | 5/2008 | Kosche et al. |
| 2008/0127149 A1 | 5/2008 | Kosche et al. |
| 2008/0140985 A1 | 6/2008 | Kitamorn et al. |
| 2008/0155348 A1 | 6/2008 | Ivanov et al. |
| 2008/0155349 A1 | 6/2008 | Ivanov et al. |
| 2008/0163183 A1 | 7/2008 | Li et al. |
| 2008/0168472 A1 | 7/2008 | Wilson |
| 2008/0243970 A1 | 10/2008 | Schmelter et al. |
| 2008/0271038 A1 | 10/2008 | Rolia et al. |
| 2008/0276129 A1 | 11/2008 | Cocker et al. |
| 2008/0282232 A1 | 11/2008 | Cong et al. |
| 2008/0288212 A1 | 11/2008 | Greifeneder |
| 2008/0288741 A1 | 11/2008 | Lee et al. |
| 2008/0312980 A1 | 12/2008 | Boulineau et al. |
| 2008/0313502 A1 | 12/2008 | Mcfadden et al. |
| 2009/0019449 A1 | 1/2009 | Choi et al. |
| 2009/0037873 A1 | 2/2009 | Ahadian et al. |
| 2009/0049428 A1 | 2/2009 | Cozmei |
| 2009/0055802 A1 | 2/2009 | Crosby |
| 2009/0089765 A1 | 4/2009 | Guo et al. |
| 2009/0106746 A1 | 4/2009 | Chaudhuri et al. |
| 2009/0125519 A1 | 5/2009 | Robison et al. |
| 2009/0138858 A1 | 5/2009 | Livshits et al. |
| 2009/0150874 A1 | 6/2009 | Chung et al. |
| 2009/0157723 A1 | 6/2009 | De et al. |
| 2009/0165016 A1 | 6/2009 | Bell |

(56) References Cited

U.S. PATENT DOCUMENTS

| | | |
|---|---|---|
| 2009/0177642 A1 | 7/2009 | Chung et al. |
| 2009/0193402 A1 | 7/2009 | Bashkansky et al. |
| 2009/0199047 A1 | 8/2009 | Vaitheeswaran et al. |
| 2009/0313525 A1 | 12/2009 | Savin et al. |
| 2009/0313600 A1 | 12/2009 | Ayers et al. |
| 2010/0011341 A1 | 1/2010 | Baierl et al. |
| 2010/0049941 A1 | 2/2010 | Howard |
| 2010/0064279 A1 | 3/2010 | Stewart |
| 2010/0077388 A1 | 3/2010 | Kimura |
| 2010/0106920 A1 | 4/2010 | Anckaert et al. |
| 2010/0115172 A1 | 5/2010 | Gillingham et al. |
| 2010/0123717 A1 | 5/2010 | Jiao |
| 2010/0125565 A1 | 5/2010 | Burger et al. |
| 2010/0125838 A1 | 5/2010 | Kuusilinna et al. |
| 2010/0131945 A1 | 5/2010 | Zeort |
| 2010/0138431 A1 | 6/2010 | Bator et al. |
| 2010/0146489 A1 | 6/2010 | Ortiz |
| 2010/0180346 A1 | 7/2010 | Nicolson et al. |
| 2010/0205583 A1 | 8/2010 | Gebhardt et al. |
| 2010/0223581 A1 | 9/2010 | Manolescu et al. |
| 2010/0251220 A1 | 9/2010 | Jeong |
| 2010/0257019 A1 | 10/2010 | Chickering et al. |
| 2010/0262832 A1 | 10/2010 | Tie et al. |
| 2010/0268816 A1 | 10/2010 | Tarui et al. |
| 2010/0281458 A1 | 11/2010 | Paladino et al. |
| 2010/0281468 A1 | 11/2010 | Pavlyushchik |
| 2010/0281488 A1 | 11/2010 | Krishnamurthy et al. |
| 2010/0287541 A1 | 11/2010 | Saunders et al. |
| 2010/0299671 A1 | 11/2010 | Kinsey |
| 2010/0306854 A1 | 12/2010 | Neergaard |
| 2010/0318994 A1 | 12/2010 | Holmberg |
| 2011/0004443 A1 | 1/2011 | Horikawa |
| 2011/0004598 A1 | 1/2011 | Kikuchi |
| 2011/0055815 A1 | 3/2011 | Squillace |
| 2011/0067008 A1 | 3/2011 | Srivastava et al. |
| 2011/0072420 A1 | 3/2011 | Cha et al. |
| 2011/0078487 A1 | 3/2011 | Nielsen et al. |
| 2011/0088021 A1 | 4/2011 | Kruglick |
| 2011/0088038 A1 | 4/2011 | Kruglick |
| 2011/0098973 A1 | 4/2011 | Seidman |
| 2011/0126286 A1 | 5/2011 | Nazarov |
| 2011/0138363 A1 | 6/2011 | Schmelter et al. |
| 2011/0138365 A1 | 6/2011 | Schmelter et al. |
| 2011/0153603 A1 | 6/2011 | Adiba et al. |
| 2011/0153817 A1 | 6/2011 | Wright et al. |
| 2011/0154289 A1 | 6/2011 | Mannarswamy et al. |
| 2011/0154296 A1* | 6/2011 | Marenco ............ G06F 11/3636 717/128 |
| 2011/0154300 A1 | 6/2011 | Rao et al. |
| 2011/0167414 A1 | 7/2011 | Lattner et al. |
| 2011/0202907 A1 | 8/2011 | Dice et al. |
| 2011/0225458 A1 | 9/2011 | Zuo |
| 2011/0258608 A1 | 10/2011 | Li et al. |
| 2011/0258611 A1 | 10/2011 | Dutta et al. |
| 2011/0258612 A1 | 10/2011 | Matthiesen et al. |
| 2011/0276951 A1 | 11/2011 | Jain |
| 2011/0283263 A1 | 11/2011 | Gagliardi et al. |
| 2011/0289485 A1 | 11/2011 | Mejdrich et al. |
| 2011/0314343 A1 | 12/2011 | Hoke et al. |
| 2011/0314448 A1 | 12/2011 | Biggerstaff et al. |
| 2011/0314543 A1 | 12/2011 | Treit et al. |
| 2012/0011519 A1 | 1/2012 | Ganesh |
| 2012/0017123 A1 | 1/2012 | Masser et al. |
| 2012/0023475 A1 | 1/2012 | Surazski et al. |
| 2012/0042212 A1 | 2/2012 | Laurenti |
| 2012/0060142 A1 | 3/2012 | Fliess et al. |
| 2012/0072579 A1 | 3/2012 | Teather |
| 2012/0079108 A1 | 3/2012 | Findeisen |
| 2012/0079456 A1 | 3/2012 | Kannan et al. |
| 2012/0079460 A1 | 3/2012 | Cho et al. |
| 2012/0102029 A1 | 4/2012 | Larson et al. |
| 2012/0110555 A1 | 5/2012 | Bates |
| 2012/0117438 A1 | 5/2012 | Shaffer et al. |
| 2012/0137273 A1 | 5/2012 | Meijler et al. |
| 2012/0144374 A1 | 6/2012 | Gallagher |
| 2012/0151396 A1 | 6/2012 | S. et al. |
| 2012/0159091 A1 | 6/2012 | Li et al. |
| 2012/0159116 A1 | 6/2012 | Lim et al. |
| 2012/0159391 A1 | 6/2012 | Berry et al. |
| 2012/0159454 A1 | 6/2012 | Barham et al. |
| 2012/0167081 A1 | 6/2012 | Sedayao et al. |
| 2012/0173703 A1 | 7/2012 | Lingen |
| 2012/0197868 A1 | 8/2012 | Fauser et al. |
| 2012/0198423 A1 | 8/2012 | Bestgen et al. |
| 2012/0204156 A1 | 8/2012 | Kettley et al. |
| 2012/0221314 A1 | 8/2012 | Bourlatchkov et al. |
| 2012/0222019 A1 | 8/2012 | Gounares |
| 2012/0222043 A1 | 8/2012 | Gounares |
| 2012/0227040 A1 | 9/2012 | Gounares |
| 2012/0233310 A1 | 9/2012 | Agarwala et al. |
| 2012/0233592 A1 | 9/2012 | Gounares |
| 2012/0233601 A1 | 9/2012 | Gounares |
| 2012/0246303 A1 | 9/2012 | Petersen |
| 2012/0254266 A1 | 10/2012 | Printezis et al. |
| 2012/0254900 A1 | 10/2012 | Kumar |
| 2012/0259962 A1 | 10/2012 | Bose et al. |
| 2012/0260135 A1 | 10/2012 | Beck et al. |
| 2012/0266014 A1 | 10/2012 | Doeden et al. |
| 2012/0266143 A1 | 10/2012 | Bhoovaraghavan et al. |
| 2012/0278504 A1 | 11/2012 | Ang et al. |
| 2012/0278594 A1 | 11/2012 | Kumar |
| 2012/0278793 A1 | 11/2012 | Jalan |
| 2012/0290672 A1 | 11/2012 | Robinson et al. |
| 2012/0296991 A1 | 11/2012 | Spivack et al. |
| 2012/0317276 A1 | 12/2012 | Muniraju |
| 2012/0317371 A1 | 12/2012 | Gounares |
| 2012/0317389 A1 | 12/2012 | Gounares |
| 2012/0317421 A1 | 12/2012 | Gounares |
| 2012/0317551 A1 | 12/2012 | Hecht et al. |
| 2012/0317556 A1 | 12/2012 | Zhu et al. |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0323827 A1 | 12/2012 | Lakshmanan et al. |
| 2012/0324454 A1 | 12/2012 | Gounares |
| 2012/0324527 A1 | 12/2012 | Brown et al. |
| 2012/0330700 A1 | 12/2012 | Garg et al. |
| 2013/0007116 A1 | 1/2013 | Strack et al. |
| 2013/0018925 A1 | 1/2013 | Pegg |
| 2013/0042156 A1 | 2/2013 | Srinivasan et al. |
| 2013/0061212 A1 | 3/2013 | Krause et al. |
| 2013/0067445 A1 | 3/2013 | Gounares |
| 2013/0073523 A1 | 3/2013 | Gounares |
| 2013/0073604 A1 | 3/2013 | Gounares |
| 2013/0073829 A1 | 3/2013 | Gounares |
| 2013/0073837 A1 | 3/2013 | Li et al. |
| 2013/0074049 A1 | 3/2013 | Gounares |
| 2013/0074050 A1 | 3/2013 | Masser et al. |
| 2013/0074055 A1 | 3/2013 | Gounares |
| 2013/0074056 A1 | 3/2013 | Gounares |
| 2013/0074057 A1 | 3/2013 | Gounares |
| 2013/0074058 A1 | 3/2013 | Gounares |
| 2013/0074092 A1 | 3/2013 | Gounares |
| 2013/0074093 A1 | 3/2013 | Gounares |
| 2013/0080642 A1 | 3/2013 | Adam et al. |
| 2013/0080760 A1 | 3/2013 | Li et al. |
| 2013/0080761 A1 | 3/2013 | Garrett et al. |
| 2013/0081005 A1 | 3/2013 | Gounares |
| 2013/0085882 A1 | 4/2013 | Gounares |
| 2013/0086348 A1 | 4/2013 | Marathe et al. |
| 2013/0086564 A1 | 4/2013 | Felch |
| 2013/0091387 A1* | 4/2013 | Bohnet ............... G06F 11/3612 714/38.1 |
| 2013/0091508 A1 | 4/2013 | Srinivasan |
| 2013/0104107 A1 | 4/2013 | De Smet et al. |
| 2013/0117753 A1 | 5/2013 | Gounares |
| 2013/0117759 A1 | 5/2013 | Gounares |
| 2013/0145015 A1 | 6/2013 | Malloy et al. |
| 2013/0145350 A1 | 6/2013 | Marinescu |
| 2013/0166886 A1 | 6/2013 | Sasanka et al. |
| 2013/0185433 A1 | 7/2013 | Zhu et al. |
| 2013/0185729 A1 | 7/2013 | Vasic et al. |
| 2013/0198729 A1 | 8/2013 | Turner et al. |
| 2013/0205009 A1 | 8/2013 | Malloy et al. |

(56) References Cited

U.S. PATENT DOCUMENTS

| | | |
|---|---|---|
| 2013/0212594 A1 | 8/2013 | Choi et al. |
| 2013/0219057 A1 | 8/2013 | Li et al. |
| 2013/0219363 A1 | 8/2013 | Wu |
| 2013/0219372 A1 | 8/2013 | Li et al. |
| 2013/0227519 A1 | 8/2013 | Maleport |
| 2013/0227529 A1 | 8/2013 | Li et al. |
| 2013/0227536 A1 | 8/2013 | Li et al. |
| 2013/0227560 A1 | 8/2013 | McGrath |
| 2013/0227573 A1 | 8/2013 | Morsi |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |
| 2013/0232463 A1 | 9/2013 | Nagaraja |
| 2013/0235040 A1 | 9/2013 | Jackson, Jr. |
| 2013/0254746 A1 | 9/2013 | Balakrishnan et al. |
| 2013/0282545 A1 | 10/2013 | Gounares |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares et al. |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0298112 A1 | 11/2013 | Gounares |
| 2013/0318506 A1 | 11/2013 | Sohm et al. |
| 2013/0332913 A1 | 12/2013 | Dickenson |
| 2013/0340077 A1 | 12/2013 | Salsamendi |
| 2013/0346479 A1 | 12/2013 | Vilke |
| 2014/0013306 A1 | 1/2014 | Gounares |
| 2014/0013308 A1 | 1/2014 | Gounares |
| 2014/0013309 A1 | 1/2014 | Gounares |
| 2014/0013311 A1 | 1/2014 | Garrett et al. |
| 2014/0019598 A1 | 1/2014 | Krajec et al. |
| 2014/0019756 A1 | 1/2014 | Krajec et al. |
| 2014/0019879 A1 | 1/2014 | Krajec et al. |
| 2014/0019985 A1 | 1/2014 | Krajec et al. |
| 2014/0025572 A1 | 1/2014 | Krajec et al. |
| 2014/0026142 A1 | 1/2014 | Gounares |
| 2014/0040591 A1 | 2/2014 | Gounares |
| 2014/0047084 A1 | 2/2014 | Breternitz |
| 2014/0047272 A1 | 2/2014 | Breternitz |
| 2014/0053143 A1 | 2/2014 | Conrod et al. |
| 2014/0068629 A1 | 3/2014 | Boller |
| 2014/0109101 A1 | 4/2014 | Radhakrishnan et al. |
| 2014/0109188 A1 | 4/2014 | Pavlov |
| 2014/0189650 A1 | 7/2014 | Gounares |
| 2014/0189651 A1 | 7/2014 | Gounares |
| 2014/0189652 A1 | 7/2014 | Gounares |
| 2014/0215443 A1 | 7/2014 | Voccio et al. |
| 2014/0215444 A1 | 7/2014 | Voccio et al. |
| 2014/0281726 A1 | 9/2014 | Garrett et al. |
| 2014/0282597 A1 | 9/2014 | Garrett et al. |
| 2014/0317454 A1 | 10/2014 | Gataullin et al. |
| 2014/0317603 A1 | 10/2014 | Gataullin et al. |
| 2014/0317604 A1 | 10/2014 | Gataullin et al. |
| 2014/0317605 A1 | 10/2014 | Gataullin et al. |
| 2014/0317606 A1 | 10/2014 | Gataullin et al. |
| 2015/0032971 A1 | 1/2015 | Tian et al. |
| 2015/0066869 A1 | 3/2015 | Seto et al. |
| 2015/0067652 A1 | 3/2015 | Seto et al. |
| 2015/0067654 A1 | 3/2015 | Seto et al. |
| 2015/0074278 A1 | 3/2015 | Maes |
| 2015/0082285 A1 | 3/2015 | Li et al. |
| 2015/0163288 A1 | 6/2015 | Maes |
| 2015/0195372 A1 | 7/2015 | Zheng |
| 2015/0205588 A1 | 7/2015 | Bates et al. |
| 2015/0222548 A1 | 8/2015 | Krajec et al. |
| 2015/0242303 A1 | 8/2015 | Gautallin et al. |
| 2015/0301920 A1 | 10/2015 | Krajec et al. |
| 2015/0304409 A1 | 10/2015 | Steuer |
| 2015/0331720 A1 | 11/2015 | Huetter et al. |
| 2015/0347268 A1 | 12/2015 | Garrett et al. |
| 2015/0347273 A1 | 12/2015 | Krajec et al. |
| 2015/0347277 A1 | 12/2015 | Gataullin et al. |
| 2015/0347283 A1 | 12/2015 | Gataullin et al. |
| 2016/0077951 A1 | 3/2016 | Krajec et al. |
| 2016/0133035 A1 | 5/2016 | Krajec et al. |
| 2016/0196201 A1 | 7/2016 | Seto et al. |
| 2016/0266998 A1 | 9/2016 | Gautallin et al. |
| 2016/0283345 A1 | 9/2016 | Gounares et al. |

FOREIGN PATENT DOCUMENTS

| | | |
|---|---|---|
| CN | 101933001 | 12/2010 |
| CN | 102460408 | 5/2012 |
| CN | 102567115 | 7/2012 |
| CN | 102789409 | 11/2012 |
| EP | 2390790 | 11/2011 |
| EP | 2553583 | 2/2013 |
| JP | 2012208830 | 10/2012 |
| KR | 2012138586 | 12/2012 |
| WO | WO0007100 | 2/2000 |
| WO | 116988 | 9/2011 |
| WO | 2011142720 | 11/2011 |
| WO | 2011146750 | 11/2011 |
| WO | 2012106571 | 8/2012 |

OTHER PUBLICATIONS

International Search Report and Written Opinion for PCT/US2013/047211 dated Nov. 27, 2013.
International Search Report and Written Opinion for PCT/US2013/043811 dated Nov. 28, 2013.
International Search Report and Written Opinion for PCT/US2013/046925 dated Nov. 25, 2013.
International Search Report and Written Opinion for PCT/US2013/046918 dated Nov. 25, 2013.
International Search Report and Written Opinion for PCT/US2013/043492 dated Nov. 6, 2013.
International Search Report and Written Opinion for PCT/US2013/044193 dated Oct. 29, 2013.
International Search Report and Written Opinion for PCT/US2013/046050 dated Nov. 8, 2013.
International Search Report and Written Opinion for PCT/US2013/046922 dated Dec. 17, 2013.
International Search Report and Written Opinion for PCT/US2013/043522 dated Nov. 6, 2013.
International Search Report and Written Opinion for PCT/US2013/046664 dated Nov. 20, 2013.
TLR "Automagically Wrapping JavaScript Callback Functions" Oct. 22, 2008.
Grossbart "JavaScript Profiling with the Chrome Developer Tools" Smashing Magazine website Jun. 12, 2012.
"Method and System for Automatically Tracking User Interactions and Providing Tags to the User Interactions" Dec. 4, 2010.
Whitehead "Java Run-Time Monitoring, Part 2:Postcompilation Instrumentation and Performance Monitoring Interception, Class Wrapping, and Bytecode Instrumentation" IBM.com Aug. 5, 2008.
Kinsey "Under the Hood: The JavaScript SDK—Error Handling" Nov. 1, 2012.
Cantrill "Instrumenting the Real-Time Web: Node.js in Production" Node Summit 2012 Presentation; Jan. 24-25, 2012.
International Search Report and Written Opinion for PCT/US2014/011727 dated May 16, 2014.
"Remote Debugging in Visual Studio 2012 on Windows 8" On Error Resume Next: Coding Through Life, One Day at the Time. Retrieved Jun. 14, 2016.
Anonymous "Time Series Analysis" Mar. 7, 2008.
International Search Report and Written Opinion for PCT/US2013/042789 dated Sep. 30, 2013.
International Search Report and Written Opinion for PCT/US2013/042030 dated Oct. 24, 2013.
International Search Report and Written Opinion for PCT/US2013/042081 dated Oct. 24, 2013.
International Search Report and Written Opinion for PCT/US2013/042788 dated Sep. 5, 2013.
International Search Report and Written Opinion for PCT/IB2014/060233 dated Nov. 11, 2014.

(56) References Cited

OTHER PUBLICATIONS

Narayanasamy et al. "BugNet Continuously Recording Program Execution for Deterministic Replay Debugging" Jun. 2005, 12 pages.
Dong et al. "Hybrid Checkpointing Using Emerging Nonvolatile Memories for Future Exascale Systems" Oct. 2004.
Erik-Svensson et al. "Mpreplay Architecture Support for Deterministic Replay of Message passing Programs on MessagePassing Many-core Processors" Sep. 2009.
Gerofi et al. "Workload Adaptive Checkpoint Scheduling of Virtual Machine Replication" 2011.
International Search Report and Written Opinion for PCT/US2013/075876 dated Apr. 7, 2014.
Wu et al. "Error Recovery in Shared Memory Multiprocessors Using Private Caches" Apr. 1990.
International Search Report and Written Opinion for PCT/US2013/073935 dated Mar. 31, 2014.
U.S. Appl. No. 13/751,012, filed Jan. 29, 2014, Office Action.
U.S. Appl. No. 13/751,012, filed Mar. 11, 2014, Office Action.
U.S. Appl. No. 13/751,026, filed Apr. 16, 2014, Office Action.
U.S. Appl. No. 13/853,769, filed May 9, 2014, Office Action.
U.S. Appl. No. 13/765,654, filed Jun. 26, 2014, Office Action.
U.S. Appl. No. 13/853,769, filed Jul. 8, 2014, Office Action.
U.S. Appl. No. 13/765,663, filed Jul. 11, 2014, Office Action.
U.S. Appl. No. 13/765,648, filed Jul. 28, 2014, Office Action.
U.S. Appl. No. 13/765,642, filed Jul. 31, 2014, Office Action.
U.S. Appl. No. 13/765,657, filed Aug. 1, 2014, Office Action.
U.S. Appl. No. 13/757,625, filed Aug. 13, 2014, Office Action.
U.S. Appl. No. 13/867,057, filed Aug. 14, 2014, Office Action.
U.S. Appl. No. 13/765,651, filed Aug. 14, 2014, Office Action.
U.S. Appl. No. 13/765,642, filed Aug. 15, 2014, Office Action.
U.S. Appl. No. 13/765,648, filed Aug. 19, 2014, Notice of Allowance.
U.S. Appl. No. 13/751,026, filed Aug. 20, 2014, Office Action.
U.S. Appl. No. 13/765,654, filed Aug. 21, 2014, Office Action.
U.S. Appl. No. 13/765,657, filed Aug. 27, 2014, Notice of Allowance.
U.S. Appl. No. 13/751,012, filed Sep. 30, 2014, Notice of Allowance.
U.S. Appl. No. 13/916,561, filed Oct. 2, 2014, Office Action.
U.S. Appl. No. 13/757,625, filed Jan. 2, 2016, Office Action.
U.S. Appl. No. 13/916,568, filed Jan. 14, 2015, Notice of Allowance.
U.S. Appl. No. 13/916,571, filed Jan. 15, 2015, Notice of Allowance.
U.S. Appl. No. 13/765,642, filed Jan. 26, 2015, Notice of Allowance.
U.S. Appl. No. 13/765,654, filed Jan. 26, 2015, Notice of Allowance.
U.S. Appl. No. 13/916,563, filed Feb. 12, 2015, Office Action.
U.S. Appl. No. 13/765,651, filed Feb. 13, 2015, Office Action.
U.S. Appl. No. 13/916,566, filed Feb. 13, 2015, Office Action.
U.S. Appl. No. 13/853,816, filed Feb. 25, 2015, Office Action.
U.S. Appl. No. 13/916,561, filed Mar. 4, 2015, Notice of Allowance.
U.S. Appl. No. 13/757,631, filed Mar. 17, 2015, Office Action.
U.S. Appl. No. 13/867,057, filed Mar. 19, 2015, Office Action.
U.S. Appl. No. 14/455,156, filed Jun. 3, 2015, Notice of Allowance.
U.S. Appl. No. 13/853,769, filed Jun. 22, 2015, Office Action.
U.S. Appl. No. 14/455,170, filed Jul. 2, 2015, Notice of Allowance.
U.S. Appl. No. 14/455,202, filed Jul. 30, 2015, Notice of Allowance.
U.S. Appl. No. 14/629,322, filed Aug. 26, 2015, Office Action.
U.S. Appl. No. 13/853,816, filed Sep. 9, 2015, Office Action.
U.S. Appl. No. 14/820,798, filed Sep. 24, 2015, Office Action.
U.S. Appl. No. 13/757,631, filed Sep. 25, 2015, Notice of Allowance.
U.S. Appl. No. 13/757,631, filed Sep. 17, 2015, Office Action.
U.S. Appl. No. 13/853,769, filed Feb. 19, 2016, Office Action.
U.S. Appl. No. 14/995,872, filed Feb. 26, 2016, Office Action.
U.S. Appl. No. 14/820,798, filed Apr. 6, 2016, Notice of Allowance.
U.S. Appl. No. 14/820,834, filed Apr. 20, 2016, Notice of Allowance.
U.S. Appl. No. 14/642,192, filed May 23, 2016, Notice of Allowance.
U.S. Appl. No. 13/853,769, filed Jun. 2, 2016, Notice of Allowance.
U.S. Appl. No. 13/867,057, filed Jun. 3, 2016, Office Action.
U.S. Appl. No. 14/995,872, filed Jun. 9, 2016, Notice of Allowance.
U.S. Appl. No. 14/617,509, filed Jul. 20, 2016, Office Action.
U.S. Appl. No. 14/582,973, filed Aug. 11, 2016, Notice of Allowance.
U.S. Appl. No. 13/853,816, filed Sep. 12, 2016, Notice of Allowance.
"Supplementary Search Report Issued in European Patent Application No. 13875046.8", Mailed Date: Sep. 5, 2016, 13 Pages.
"Supplementary Search Report Issued in European Patent Application No. 13874921", Mailed Date: Sep. 8, 2016.
Office Action dated Dec. 1, 2016 issued in U.S. Appl. No. 14/820,957.
"Supplementary Search Report Issued in European Patent Application No. 14785777", Mailed Date: Nov. 3, 2016.
Ravindranath, et al. "Appinsight: Mobile App Performance Monitoring in the Wild", Usenix, Apr. 11, 2013 pp. 1-14.
Graham et al. "Gprof: A Call Graph Execution Profiler", PLDI 09: Proceedings of the 2009 ACM Sigplan Conference on Programming Language Design and Implementation, Jun. 15-20, 2009.
Office Action dated Dec. 14, 2016 issued in U.S. Appl. No. 13/867,057.
"Supplementary Search Report Issued in European Patent Application No. 13875228.2", Mailed Date: Dec. 16, 2016.
Office Action issued in U.S. Appl. No. 14/617,509 dated Dec. 23, 2016.
Chinese Office Action issued in China Patent Application No. 201380075071.1. Mailed date: Mar. 3, 2017.
Chinese Office Action issued in China Patent Application No. 201380072861.4. Mailed date: Mar. 9, 2017.
Extended European Search Report issued in EPO application No. 14785777.5 mailed Mar. 16, 2017.
Chinese Office Action issued in CN Application No. 201380072863.3 mailed Apr. 6, 2017.
Office Action dated Apr. 3, 2017 cited in U.S. Appl. No. 14/671,449.
Chinese Office Action issued in CN Application No. 201380072856.3 dated May 15, 2017.
Extended Search Report Issued in European Patent Application no. 14843127.3, dated Apr. 13, 2017, 9 Pages.
Extended European Search Report issued in European Patent Application No. 14862130.3 dated May 24, 2017.
U.S. Appl. No. 14/820,957, mailed May 19, 2017, Notice of Allowance.
Chinese Office Action issued in CN Patent Application No. 201480035488.X mailed May 26, 2017.
U.S. Appl. No. 14/671,449, mailed Jun. 23, 2017, Notice of Allowance.

* cited by examiner

USER INTERFACE FOR SELECTING
TRACING ORIGINS FOR AGGREGATING
CLASSES OF TRACE DATA

CROSS REFERENCE TO RELATED
APPLICATIONS

This application claims priority to and benefit of U.S. Patent Application Ser. No. 61/903,775 filed 13 Nov. 2013 entitled "Application Execution Path Tracing with Configurable Origin Definition", U.S. Patent Application Ser. No. 61/903,781 filed 13 Nov. 2013 entitled "User Interface for Selecting Tracing Origins for Aggregating Classes of Trace Data", and U.S. Patent Application Ser. No. 61/903,786 filed 13 Nov. 2013 entitled "Tracing Origin Rules for Minimizing Trace Data Collection by Sampling", all of which are hereby expressly incorporated by reference for all they disclose and teach.

BACKGROUND

Tracing is a mechanism for monitoring the operations and sometimes performance of an application as it executes. When an application executes under production or artificial loads, the application may execute many different sequences or paths through the executable code, and may generate large amounts of tracer data.

SUMMARY

A tracing system may define an origin for consolidating and comparing trace paths within a traced application. A tracer may define an identifier that may be passed through a tracing route, and the identifier may be defined to capture specific instances or groups of instances of traces. The traces may be consolidated into a graphical representation of the program flow. The identifier may be passed across various boundaries, including function boundaries, library boundaries, application boundaries, device boundaries. An analysis system may consolidate or aggregate trace results having the same identifier, and may render such data graphically or provide statistics using the identified datasets.

A user interface may select a location within a graphical representation of an application's structure to identify an origin for tracing operations. The origin may define a location where identifiers may be inserted into a traced application, and the identifiers may be associated with tracer data collected under certain conditions. A set of rules may define certain conditions for tracing the application, and such rules may contain logic for assigning identifiers. The user interface may be a graphical depiction of an application's flow, and a user may select from a set of predefined options to define how tracing may be implemented.

A tracing system may add identifiers to tracing paths to identify which operations to collect data, such that those tracing operations where the identifier is present may collect data and those without an identifier may collect limited or no data. The identifiers may be added using a logic that may cause the tracing system to sample operations of an application, as opposed to tracing all operations. The sampling algorithm may be a general sampling algorithm where a certain percentage of operations may be traced, or may be targeted to tracing some execution paths at a higher rate than other execution paths. In some cases, the sampling algorithm may be defined by analyzing previous tracer data to identify those execution paths that are of interest for higher levels of tracing and other execution paths to which a lower sampling rate may be applicable.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Application Execution Path Tracing with Configurable Origin Definition

A computer software tracing system may be configurable to trace individual execution paths. An origin point may define a location within an application where a set of identifiers may be defined for tracing execution paths. At the origin, a tracer may create identifiers that may be passed throughout an execution path by a tracer. The tracer may create a tracer dataset having a common identifier, from which statistics, visualizations, and other analyses of the tracer data may occur.

The identifiers may be defined by a set of rules that may be evaluated at a point within an application. In some embodiments, the set of rules may be defined for different functions, libraries, modules, reusable software components, interfaces, events, or other situation. When evaluated, the identifiers may classify tracing paths with unique identifiers or for identifiers that may represent a class or group of tracing paths.

In one use case, an identifier may be added to trace data for an input to a web service. In the example use case, the web server may respond to requests for web pages or other data across a network interface. A tracer may be implemented to gather performance and operational data as each function executes within the web server application. A set of rules may be evaluated at the incoming web requests to identify each incoming request with the session identifier for a particular user. As the tracer operates, the session identifier may be associated with each data item. A subsequent trace data analyzer may aggregate the trace data with each session identifier to show statistics for each session independently.

In the example use case, the set of rules may be modified to create an identifier for a specific class of input, such as creating an identifier for a specific web page request. Each instance of the web page request may have the same identifier, such that a subsequent trace data analyzer may aggregate trace data for all requests of each specific web page. Statistics, visualizations, or other output may be generated for how the web server responded to the various web pages.

User Interface for Selecting Tracing Origins for Aggregating Classes of Trace Data A user interface may display a graphical topology of an application structure from which a tracing origin may be selected. A topology may show functions, libraries, modules, or other components of an application from which a user may select. After selecting a component, a user may be able to define logic for aggregating trace data that may flow from the selected component.

The user interface may illustrate an application's topology from trace data gathered by observing the operations of the application. The illustration may show application components as nodes in a graph, with edges of the graph illustrating connections between the components. In some cases, such illustrations may include representations of performance data.

A user may select a component from a graph, then be able to define how trace data may be aggregated for downstream operations. At the origin, the tracer may create identifiers that may be passed along the execution path. Subsequent analyses may aggregate the commonly labeled trace data into statistics, graphical representations, or other analyses.

The user may be able to select from a set of input values received by a function as an option for aggregating trace data. The set of input values may be observed by a tracer over time, then sorted and listed to the user as possible options for tracing. In some cases, the user may be able to select individual input value, groups of input values, or other each of the input values for tracing. The subsequent tracing data may be aggregated and presented to the user according to the selected options.

The user may be presented with other options for classifying and aggregating downstream trace data. Such options may be generated by analyzing previously gathered trace data to classify the downstream behavior of the application. The classifications may identify those execution paths or conditions where excessive errors occur, for example, or where other conditions may exist. Such options may allow a user to configure a tracer to collect trace data of interest while possibly not tracing conditions that may yield little or no interesting data.

Tracing Origin Rules for Minimizing Trace Data Collection by Sampling

A tracing system may have rules for labeling or identifying trace datasets, and such rules may define a sampling mechanism for tracing. By sampling the operations of an application, overhead effects of a tracer may be minimized in a production application. The sampling may be applied at different levels, based on a set of conditions defined in a set of rules for an origin point. The rules may define conditions for low frequency sampling, such as sampling one time out of 10, 100, or 1000, and other conditions for higher sampling frequencies.

The sampling may selectively identify execution sequences to trace and following those execution sequences to completion. Such sampling may more accurately reflect the operations of an application than separately sampling trace data from individual function within an application.

Sampling trace data may be useful in production situations where many operations of an application may be repetitive. Sampled trace data may be useful to identify trends in the operation of an application. Such trends may be identified with nearly the same statistical accuracy on sampled data as with a complete set of data, however, sampled data consumes less tracer overhead, trace data storage, and analyses.

In some embodiments, the sampling rate may be adjusted over time as trace data becomes more stable. For functions that are well behaved, the sampling frequency may be decreased, while functions with poor reliability may be increased. In some embodiments, sampling frequency may be increased when an error or other abnormality may be detected. Such increased sampling frequency may provide more accurate data to identify conditions where an error or abnormality occurred.

Throughout this specification and claims, the term "component" is used to define a group of reusable code that may be incorporated into an application. A component may be known as a 'module', 'library', 'subroutine', or some other notion. For the purposes of this specification and claims, these terms are considered synonymous.

The "component" may be code that is arranged in a way that multiple applications may access the code, even though the applications may have no connection with each other. In general, a "component" may be code that is configured to be reused. In some cases, a component may be reused within the scope of a large application, while in other cases, the component may be shared to other application developers who may use the component in disparate and unconnected applications.

Many programming languages and paradigms have a notion of a "component" or library, where the component may have a defined interface through which an application may invoke and use the component. Some paradigms may allow a programmer to incorporate a component in a static manner, such that the component code does not further change after the application is written and deployed. Some paradigms may allow for dynamic libraries, which may be loaded and invoked at runtime or even after execution has begun. The dynamic libraries may be updated and changed after the application may have been distributed, yet the manner of invoking the libraries or components may remain the same.

Components may be distributed in source code, intermediate code, executable code, or in some other form. In some cases, components may be services that may be invoked through an application programming interface.

Throughout this specification and claims, the term "component" may be applied to a single reusable function. Such a function may be distributed as part of a library, module, or other set of code, and may reflect the smallest element of reusable code that may be distributed. A single "component" as referenced in this specification and claims may be an individual application programming interface call or callable subroutine or function, as well as a module, library, or other aggregation of multiple callable functions, application programming interface calls, or other smaller elements.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced. The collected data may also include cache misses, garbage collection operations, memory allocation calls, page misses, and other parameters.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
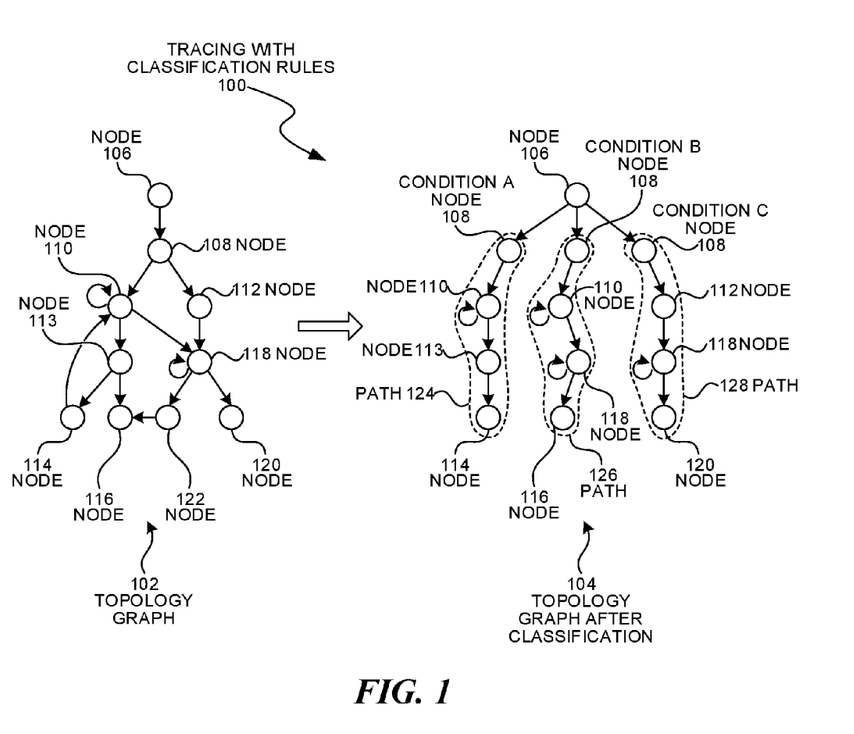
FIG. 1 is a diagram illustration of an embodiment showing topology graphs with and without execution path tracing enabled.

FIG. 1 is an illustration of an embodiment 100 showing topology graphs before and after classification of execution paths. A general topology graph 102 may show an application's components and their connections, where each connection may be an observed connection from tracer data. A topology graph 104 may show the connections after applying execution path tracing.

Execution path tracing may begin at an origin location within an application and may create identifiers for the execution paths. The identifiers may be passed along the execution path so that tracer data may be identified with the execution path. Tracing data with the same execution path identifiers may be grouped and displayed on a topology graph.

The execution path identifiers may be unique identifiers for each instance of the execution path. In such embodiments, every traversal through the application code may have a different identifier and thus each path may be separately stored, analyzed, and visualized.

The execution path identifiers may have an identifier for specific classes of execution paths. In such embodiments, the trace data from a given execution path may be consolidated and analyzed as a group.

Execution path tracing may allow certain portions of an application to be observed. At an origin location within the application, a tracer may create identifiers for execution paths, then pass the identifiers along the execution path, collecting tracer data along the way. The tracer data may be labeled with the identifier, then the data with the same identifiers may be analyzed as a group.

In one use case, a specific execution path may be identified as starting at a specific function. When tracing the function, a set of tracer rules may be evaluated to determine if the current execution path fits the definition of an execution path of interest. The tracer may create an identifier for the execution path, then begin tracing the function. As the execution continues, the identifier may be passed to subsequent functions in the execution path. At each downstream function, a tracer may detect the presence of the identifier, then trace the downstream function and label the data. The resulting data may reflect the trace of just the execution path of interest, without other trace data. Such resulting data may be analyzed, visualized, or otherwise processed to give a developer a detailed look at the specific execution path.

In another use scenario, an application may function in several distinct modes, but may use overlapping sets of functions to deliver each of the modes. The application may be traced by identifying a function where the modes may originate, then creating identifiers for each execution path. A tracer may make an evaluation at the origin function to determine the execution path, then label each execution path.

In one example of such a scenario, a website server application may respond to requests for various web pages. Each web page may have different functionality, but may generally use many of the same downstream functions. An origin function may be a function where webpage requests are received, and a tracer may label each execution path with the label of the webpage being requested. After executing a tracer in such a configuration, the tracer data for each webpage may be readily identified and studied.

Embodiment 100 illustrates one such change in topology when execution path labeling is used. Graph 102 may illustrate a complete topology graph of an application, where each node may represent a function or block of executable code, and each edge may represent a connection or program flow between the functions.

Node 106 is connected to node 108, which branches to nodes 110 and 112. Node 110 may loop back on itself, and may branch to nodes 113 and 118. Node 113 may branch to nodes 114 and 116, and node 114 may return to node 113. Node 112 may flow to node 118, which may loop back on itself, then branch to nodes 120 and 122. Node 122 may continue to node 116.

The topology of graph 102 may reflect the complete topology of an application. However, the application may have three major functions, which may originate at node 108. When execution path tracing is deployed at node 108, each mode of node 108 may start a new execution path, which may be traced using an identifier for the corresponding execution path.

In graph 104, the topology graph may be shown with the execution paths. The graph may begin with node 106. Because node 108 is an origin node and may operate in three distinct modes, the execution paths for the three modes may be labeled and displayed. The execution paths 124, 126, and 128 may illustrate such modes.

Execution path 124 contains node 108 in the first condition, then nodes 110, 113, and 114. Execution path 126 contains node 108 in the second condition, the nodes 110, 118, and 122. Lastly, execution path 128 contains node 108 in the third condition, then nodes 112, 118, and 120.

Graph 104 may illustrate the topology of an application in a more understandable way than graph 102. Graph 102 may illustrate all of the connections between various software elements, but graph 104 illustrates the execution flow of the application in its modes of operation. Such an illustration may be more useful to visualize the actual operation of an application.

Figure 2:
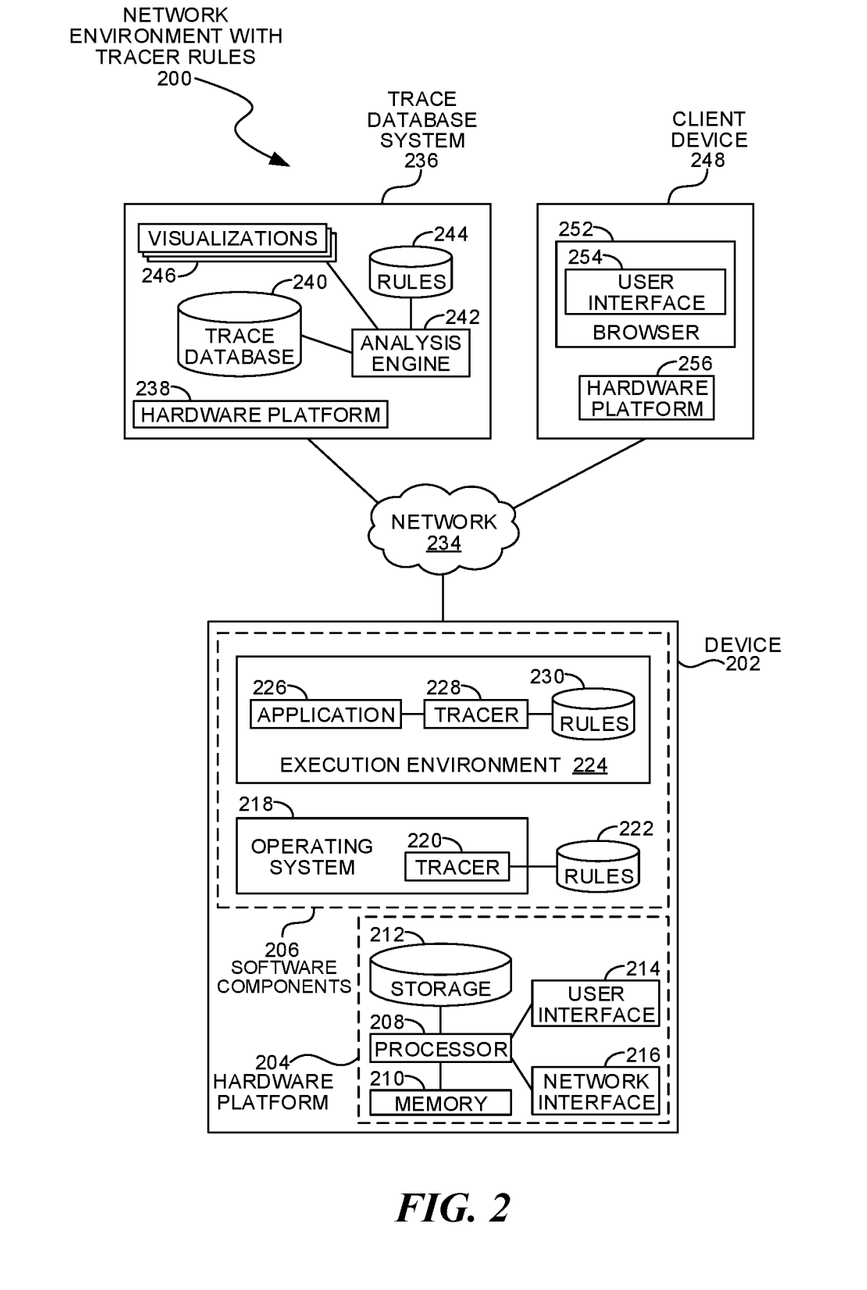
FIG. 2 is a diagram illustration of an embodiment showing a network environment with devices that may trace using execution path tracing.

FIG. 2 is a diagram of an embodiment 200 showing components that may collect data when an application executes by using tracer rules that may change tracer behavior, including adding execution path identifiers.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. Some embodiments may execute applications directly on the operating system 218, while other embodiments may use an execution environment 224, which may be a virtual machine or other abstraction. When applications execute on the operating system 218, a tracer 220 may have some operating system connections. The tracer 220 may execute with a set of rules 222 which may control the tracer behavior.

When applications execute in an execution environment 224, the application 226 may operate with a tracer 228 which may have a set of rules 230 that may control tracer behavior.

The rules 222 or 230 may define settings or options for the tracer, and may identify conditions for changing the tracer settings. In some cases, the rules may increase or decrease the amount of data being collected. Some such rules may identify specific types of data to collect, variable values to capture, performance or operational data that may be collected, or other behavioral changes.

The rules may also identify execution paths for tracing. The execution paths may be sequences of application operations that may be sequentially related to each other. Some execution paths may be sequential, while other execution paths may branch into multiple processes, threads, or other sequences of execution which may execute in parallel.

The execution paths may be traced by creating an identifier for the execution path, then passing the identifier through the execution path to downstream functions. One mechanism for transmitting such an identifier may be to wrap an origin function in a tracer function, and the wrapper may pass the identifier as state within the wrapper. Many other implementation mechanisms may be used to trace an execution path and apply an identifier to the trace data.

A network 234 may connect various devices in the example of embodiment 200. In other embodiments, all of the various functions may be implemented on a single hardware platform, while in still other embodiments, some of the various functions may be distributed on multiple hardware platforms.

A trace database system 236 may collect trace data, perform analysis of trace data, generate tracing rules, and provide visualizations of the trace data. The trace database system 236 may execute on a hardware platform 238, which may be similar to the description of hardware platform 204.

A trace database 240 may collect trace data created on the device 202. The trace database 240 may receive, store, and process trace data for analysis.

An analysis engine 242 may perform statistical and other analyses of the trade data, including generating visualizations 246 of the trace data, such as topology graphs and other visualizations.

The analysis engine 242 may assist in creating rules 244 for a tracer. The analysis engine 242 may identify statistics, modes of operation, or other information that may be used by a human to select rules from which execution paths may be traced. In some cases, the analysis engine 242 may include a set of heuristics or other mechanisms to determine conditions for sampling the traces performed on an execution path.

The rules 222 and 230 may identify execution paths that may be traced by sampling the execution paths. Sampling may not trace every instance of an execution path, but may trace only a subset of instances. Sampling may be useful to reduce the overhead consumed by a tracer, but may still yield statistically significant results.

Sampling may be applied with different frequencies based on the execution path. For example, an execution path that is very stable may have a low level of sampling, while an execution path with wide performance variability may be sampled at a high frequency. Such a system may capture larger sets of data for execution paths that may be poorly behaved while capturing less data for those execution paths that may be well behaved.

The analysis engine 242 may examine the trace database 240 to determine which execution paths may be well behaved and which may be poorly behaved. Based on the performance of the various execution paths, the analysis engine 242 may create rules 244 which may increase or decrease tracing sampling of the execution paths.

A client device 248 may be a device from which a user may view various visualizations 246 and may interact with the analysis engine 242, trace database 240, and create rules 244, among other things. The client device 248 may operate on a hardware platform 250, which may be similar to that described for the hardware platform 204.

The client device 248 may have a browser 252 in which a user interface 254 may be displayed. The user interface 254 may be served from a webserver that may access the trace database 240, analysis engine 242, rules 244, visualizations 246, and other information.

Figure 3:
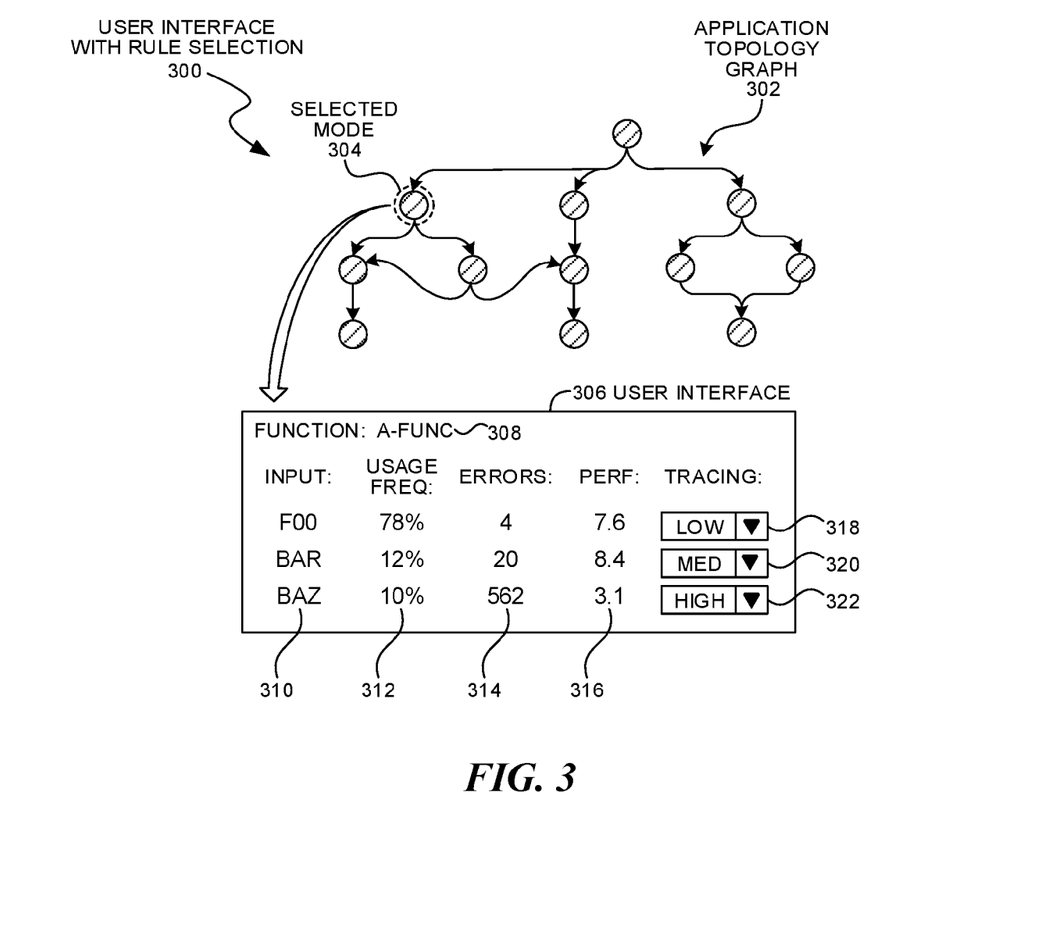
FIG. 3 is a diagram illustration of an embodiment showing an example user interface for creating rules for execution path tracing.

FIG. 3 is diagram illustration of an example embodiment 300 showing an application topology graph 302 and a mechanism for selecting rules for execution path tracing. Embodiment 300 is merely one example of an interactive mechanism for soliciting input from a user from which tracer rules may be generated.

The user interface may have an application topology graph 302 which may illustrate elements of an application and the flow between those elements. Each node may represent an application or other executable component, event, interface, element, or other item.

A user may be able to select a specific node, such as the selected node 304. When the node 304 may be selected, a user interface 306 may be presented to the user. The user interface 306 may present some information to a user that may be assist in creating rules for tracing execution paths.

The user interface 306 may show a function's name 308, as well as some analyzed data for possible execution paths. In the example of embodiment 300, three different input values may be illustrated in column 310 as "foo", "bar", and "baz". Various statistics may be shown for the user for each input value, such as usage frequency in column 312, errors in column 314, and performance 316.

The suggested classifications for execution paths may be determined by analyzing tracing data previously collected for a given node. Such analysis may attempt to determine which variables may be dominant factors that may differentiate the behavior of different execution paths.

A user may have input mechanisms 318, 320, and 322 that may capture a user's input, which may be processed to generate tracer rules. In the example of embodiment 300, a user may have options to select between low, medium, and high levels of tracing. Each embodiment may have different definitions for such designators. In some cases, such terms may refer to the sampling frequency. In some cases, such terms may reflect the amount of data collected at each event that may be traced.

Figure 4:
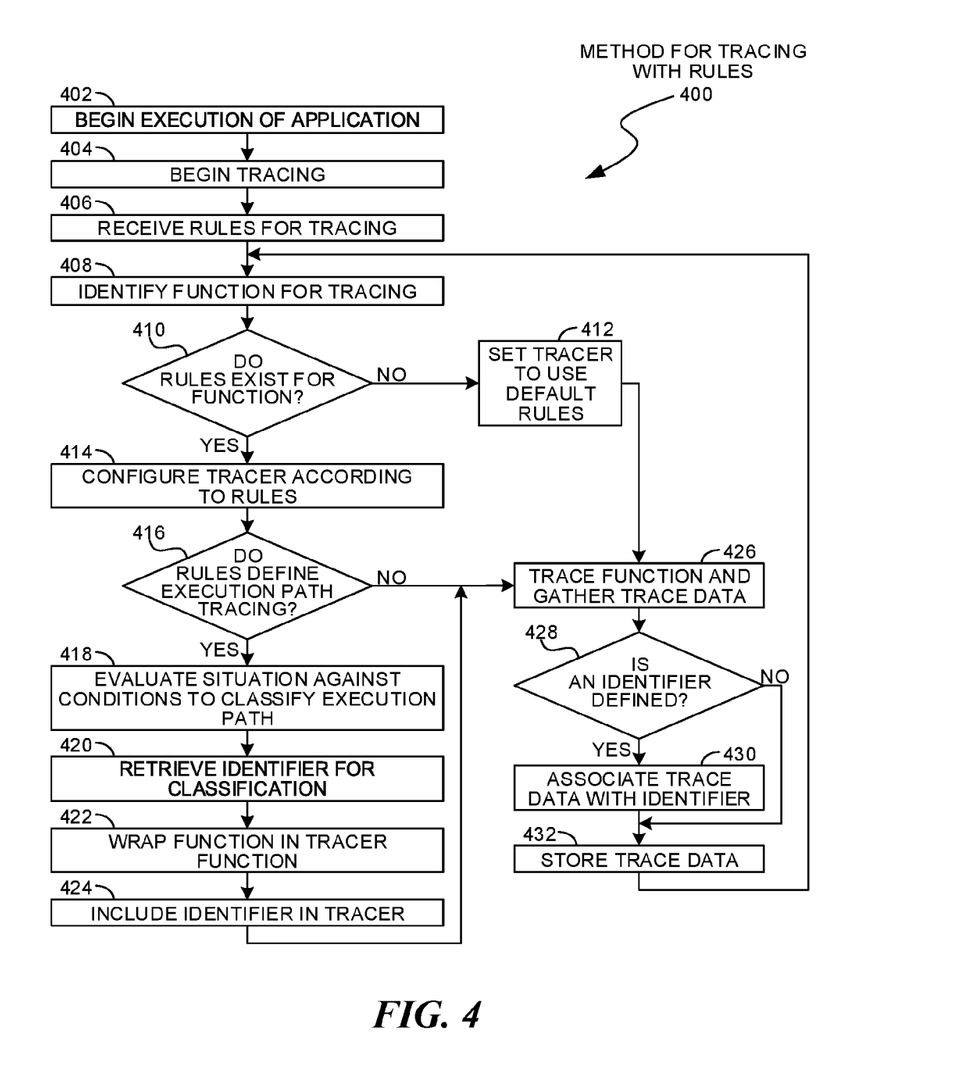
FIG. 4 is a flowchart illustration of an embodiment showing a method for tracing with rules.

FIG. 4 is a flowchart illustration of an embodiment 400 showing a method for tracing with rules. Embodiment 400 may illustrate a system where rules may be applied at each function where tracing may occur. The rules may change the tracer behavior by adding or removing parameters to capture, performing analysis at a tracing event, and other items. In some cases, the rules may include executable code that may be evaluated during tracing.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may illustrate one mechanism for deploying execution path tracing using tracer rules. The tracer rules may contain one or more conditions under which execution path tracing may occur, as well as a mechanism for identifying the execution paths. When the execution path at a given function matches the conditions for execution path tracing, the execution path may be identified. An identifier may be passed downstream to other functions, which may identify tracer data with the same identifier, thereby linking trace data into the same execution path.

Execution of an application may begin in block 402 and tracing may begin in block 404. The tracer rules may be received in block 406.

A function to trace may be identified in block 408. The function to be traced may be identified when the application execution has proceeded to the function and the function is identified by the tracer.

If no rules are defined for the function in block 410, the tracer may be set to default rules in block 412. If rules are defined for the function in block 410, the tracer may be configured according to the rules in block 414.

If the rules do not define execution path tracing in block 416, the function may be traced in block 426 with the tracer as configured.

When the rules do define execution path tracing in block 416, the function state may be evaluated in block 418 to classify the execution path. Based on the classification, an identifier may be retrieved in block 420. The function may be wrapped in a tracer function in block 422 and the identifier may be included in the wrapped tracer in block 424. The process may continue to block 426 to trace the function and gather trace data.

If an identifier is defined for the trace data in block 428, the trace data gathered by the tracing in block 426 may be associated with the identifier in block 430 and stored in block 432. The process may return to block 408 to continue execution until another function may be identified for tracing.

On downstream functions that may or may not have tracer rules defined, the tracer may continue to gather trace data in block 426 and associate identifiers with the trace data.

Figure 5:
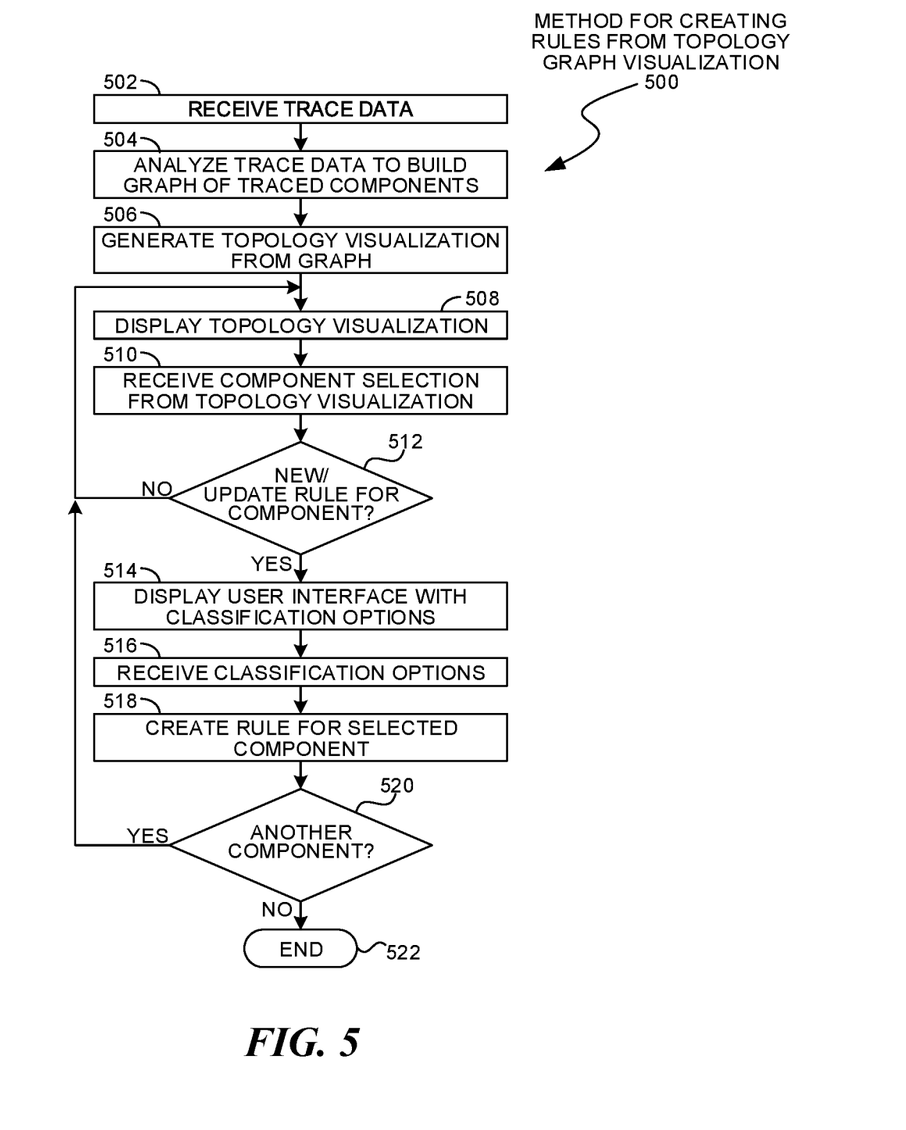
FIG. 5 is a flowchart illustration of an embodiment showing a method for creating rules from topology graph visualizations.

FIG. 5 is a flowchart illustration of an embodiment 500 showing a method for creating rules from a topology graph representation. Embodiment 500 may illustrate a method that may be performed by an analysis engine and user interface to generate useful data that may assist a user in selecting execution paths for tracing.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Trace data may be received in block 502.

A graph of traced components may be generated in block 504 from the trace data, and a topology visualization may be generated from the graph in block 506.

The topology visualization may be displayed in block 508. A selection of an application component may be received in block 510. The selection may be made by a user viewing the topology visualization.

When a user wishes to create a new rule or update an existing rule relating to the selected component in block 512, a user interface with classification options may be presented in block 514.

The user interface with classification options may include modes of operation that may be derived from the tracer data by an analysis engine. In many embodiments, a set of heuristics may be applied to suggest common factors from which execution paths may be classified. An example of such a user interface may be the user interface 306 of embodiment 300.

A user may also be able to specify the sampling desired for a given execution path in block 516.

A set of classification options may be received from the user in block 516 and a set of rules may be created in block 518. If another component may be selected in block 520, the process may return to block 508. When no other components are selected in block 520, the process may end in block 522.

Figure 6:
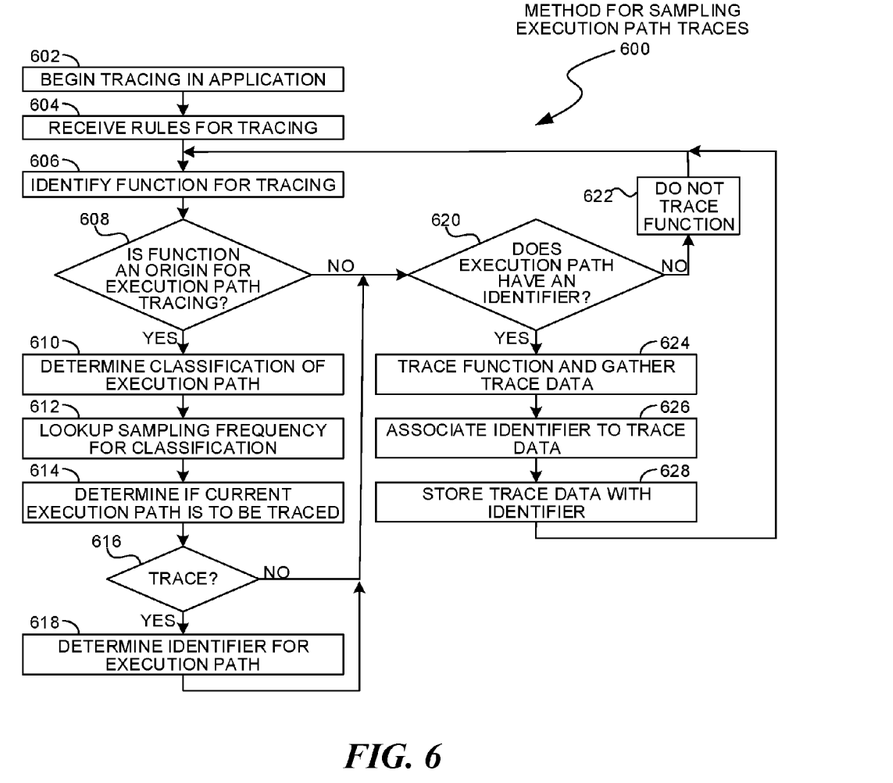
FIG. 6 is a flowchart illustration of an embodiment showing a method for sampling execution path traces.

FIG. 6 is a flowchart illustration of an embodiment 600 showing a method for tracing with rules that include sampling. Embodiment 600 may illustrate operations of a tracer that may sample certain execution paths. Each traced execution path may be assigned an identifier. When the identifier may be present for downstream functions, tracing may be performed, but when the identifier is not present, tracing may be minimized or not performed at all.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may assign identifiers to execution paths when the execution path may be selected for sampling. Such a system may use the identifier as an indication that tracing may be performed on downstream functions. By assigning identifiers to only a subset of execution paths, tracing may be performed on a sample or subset of execution paths. Sampling may be one mechanism to minimize overhead effects to an application's performance while still collecting some tracing data.

Tracing may begin in block 602. The rules for tracing may be received in block 604. A function may be identified for tracing in block 606.

If the function may be an origin for execution path tracing in block 608, the execution path may be classified in block 610. The sampling frequency of the execution path may be determined in block 612, and a determination may be made as to whether or not the current execution path is to be traced in block 614.

A sampling frequency may define a percentage or other fraction of execution paths to trace. For example, a sampling frequency of 10% may trace 1 of 10 execution paths, leaving 9 of 10 execution paths without tracing.

If the current execution path is not selected for sampling in block 616, the process may proceed to block 620. If the current execution path is selected for sampling in block 616, an identifier for the execution path may be determined in block 618 and the tracer may be configured to trace the execution path. The process may continue to block 620.

If the execution path does not have an identifier in block 620, the function may not be traced in block 622 and the process may continue to block 606.

When the execution path does have an identifier in block 620, the function may be traced and trace data may be gathered in block 624. The execution path identifier may be associated with the trace data in block 626 and the data may be stored in block 628. The process may continue to block 606.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on at least one processor, said method comprising:
   receiving trace data of an application, said application comprising a plurality of components;
   analyzing said trace data of said application to generate a first topology graph of said application, said first topology graph of said application comprising representations of said plurality of components;
   displaying said first topology graph of said application in an interactive user interface;
   receiving a first selection from a user input device, said first selection comprising a first component within said first topology graph of said application;
   receiving a second selection from said user input device, said second selection comprising a first condition for tracing execution paths passing through said first component within said first topology graph of said application; and
   creating a tracer rule associated with said first component within said first topology graph of said application to store said first condition for tracing said execution paths passing through said first component within said first topology graph of said application.

2. The method of claim 1, said first topology graph of said application being generated from trace data gathered by monitoring said application and identifying said plurality of components within said trace data.

3. The method of claim 2 further comprising:
   displaying a second topology graph of said application in said interactive user interface, said second topology graph comprising trace data organized at least in part by said tracer rule.

4. The method of claim 3, said tracer rule being consumed by a tracer to classify at least one execution path of said application.

5. The method of claim 4, said tracer rule being consumed by a tracer to classify execution paths into a plurality of classifications.

6. The method of claim 1 further comprising:
   presenting a user selection interface comprising a plurality of classification suggestions, said second selection from said user input device being selected from said plurality of classification suggestions.

7. The method of claim 6 further comprising:
   analyzing tracer data for said application to determine a plurality of input values for said first component within said first topology graph of said application; and
   presenting at least a subset of said plurality of input values as said plurality of classification suggestions.

8. The method of claim 6 further comprising:
   analyzing tracer data for said application to determine a plurality of execution paths organized by frequency of use; and
   presenting at least a subset of said plurality of execution paths as said plurality of classification suggestions.

9. The method of claim 6 further comprising:
   analyzing tracer data for said application to determine a plurality of execution paths organized by errors detected; and
   presenting at least a subset of said plurality of execution paths as said plurality of classification suggestions.

10. The method of claim 6 further comprising:
    analyzing tracer data for said application to determine a plurality of execution paths organized by a performance metric; and
    presenting at least a subset of said plurality of execution paths as said plurality of classification suggestions.

11. A system comprising:
    at least one processor;
    a trace database comprising trace data gathered from tracing an application;
    an analysis engine that:
      receives trace data of said application, said application comprising a plurality of components; and
      analyzes said trace data of said application to generate a first topology graph of said application, said first topology graph of said application comprising representations of said plurality of components; and
    an interactive user interface presented on a device comprising said at least one processor, said interactive user interface that:
      displays said first topology graph of said application;
      receives a first selection from a user input device, said first selection comprising a first component within said first topology graph of said application;
      receives a second selection from said user input device, said second selection comprising a first condition for tracing execution paths passing through said first component within said first topology graph of said application; and
      creates a tracer rule associated with said first component within said first topology graph of said application to store said first condition for tracing said execution paths passing through said first component within said first topology graph of said application.

12. The system of claim 11, said interactive user interface that further:
   presents a user selection interface comprising a plurality of classification suggestions, said second selection from said user input device being selected from said plurality of classification suggestions.

13. The system of claim 12, said analysis engine that further:
   analyzes tracer data for said application to determine a plurality of input values for said first component within said first topology graph of said application;
   said interactive user interface that further:
      presents at least a subset of said plurality of input values as said plurality of classification suggestions.

14. The system of claim 13, said analysis engine that further determines said plurality of input values from a plurality of execution paths classified by frequency of use.

15. The system of claim 13, said analysis engine that further determines said plurality of input values from a plurality of execution paths classified by errors detected.

16. The system of claim 13, said analysis engine that further determines said plurality of input values from a plurality of execution paths classified by a performance metric.

* * * * *